United States Patent [19]

Shutt et al.

[11] Patent Number: 5,488,078
[45] Date of Patent: Jan. 30, 1996

[54] COMPOSITIONS FOR CONSTRUCTION MATERIALS

[75] Inventors: John R. Shutt, Tervuren, Belgium; Benoit M. F. Touzard, Mont-Saint-Aignan, France

[73] Assignee: Exxon Chemical Patents Inc., Linden, N.J.

[21] Appl. No.: 234,522

[22] Filed: Apr. 28, 1994

[30] Foreign Application Priority Data

Apr. 29, 1993 [GB] United Kingdom ............ 9308883

[51] Int. Cl.$^6$ .................. C08L 95/00; C08L 57/02; C08K 5/01
[52] U.S. Cl. .................. 524/71; 524/59; 524/70; 524/474; 524/484; 524/485; 524/490; 524/491; 524/499
[58] Field of Search ............ 524/59, 70, 71, 524/484, 485, 490, 491, 499, 474

[56] References Cited

U.S. PATENT DOCUMENTS

| | | | |
|---|---|---|---|
| 3,395,110 | 7/1968 | Crady | 524/70 |
| 3,415,769 | 12/1968 | Todd et al. | 524/474 |
| 3,444,117 | 5/1969 | Higgins et al. | 524/70 |
| 3,459,695 | 8/1969 | Hedge et al. | 524/70 |
| 3,536,653 | 10/1970 | Bickel et al. | 524/474 |
| 3,669,918 | 6/1972 | Raley | 524/70 |
| 3,790,519 | 2/1974 | Wahlborg | 524/70 |
| 3,963,659 | 6/1976 | Binder et al. | 524/70 |
| 4,263,186 | 4/1981 | Bluemel | 524/59 |
| 4,837,252 | 6/1989 | Seguin et al. | 524/71 |
| 5,276,081 | 1/1994 | Nakahama et al. | 524/491 |

FOREIGN PATENT DOCUMENTS

| | | | |
|---|---|---|---|
| 174795 | 3/1986 | European Pat. Off. | |
| 0315239 | 5/1989 | European Pat. Off. | 524/71 |
| 0343647 | 11/1989 | European Pat. Off. | 524/499 |
| 351736 | 1/1990 | European Pat. Off. | |
| 416815 | 3/1991 | European Pat. Off. | |
| 1368242 | 6/1964 | France | |
| 2309039 | 9/1974 | Germany | 524/491 |
| 0250044 | 10/1987 | Japan | 524/490 |
| 1247247 | 9/1971 | United Kingdom | |
| 1522852 | 8/1978 | United Kingdom | |
| 2164344 | 3/1986 | United Kingdom | |

*Primary Examiner*—Peter A. Szekely
*Attorney, Agent, or Firm*—Darrell E. Warner

[57] ABSTRACT

Disclosed are compositions of a two-phase mixture of a structural bitumen component and a thermoplastic polymer derived predominantly of ethylene and at least one other non-cyclic alpha-olefin, wherein the polymer has a crystallinity of less than 18% and a solubility distribution index value of less than 28° C. Also disclosed is a method for producing such compositions. Such compositions are particularly useful as road paving and construction materials.

23 Claims, 1 Drawing Sheet

COMPOSITIONS FOR CONSTRUCTION MATERIALS

The invention relates to compositions for construction materials suitable for use in the building industry and in particular for bitumen or bitumen-like compositions subjected to strains at lower temperatures such as road surfaces.

BACKGROUND OF THE INVENTION

Bitumen and bitumen-like materials have been modified with a variety of polymers in order to add strength in a variety of environmental conditions encountered in for example road paving and roof membranes. Both polymer-type and blending/mixing process must be selected to accommodate prevailing requirements in the industry.

As examples of such modification, there can be mentioned:

1. Bitumen sheeting. Styrene-butadiene block copolymers and ethylene-propylene rubbers have been added to provide increased strength.

2. Synthetic binders. Formulations including hydrocarbon tackifier resins which are transparent and can be colored having been made less brittle by including polymers.

3. Road surfaces. Bitumen or asphalt has been modified with styrene-butadiene block copolymers, ethylene propylene rubber, ethylene vinyl acetate and methylacrylate copolymers, propylene-butene copolymers to improve wear resistance. Propylene-butene copolymers (Vestoplast made by Huels AG) have been used to improve physical properties at low temperatures.

4. Thermoplastic road marking. Formulations include hydrocarbon tackifiers ethylene vinyl acetate (EVA) and styrene-isoprene-styrene block copolymer (SIS).

Examples of patent specifications include:

FR 1 368 242; U.S. Pat. No. 3395110; U.S. Pat. No. 3459695; U.S. Pat. No. 4263186; U.S. Pat. No. 3 444 117; GB 2 164 344; GB 1247247; GB 1522852; EP 174 795; EP 351736; U.S. Pat. No. 3 669 918; U.S. Pat. No. 3 790 519.

Dow EP 416 815 discloses the modification of asphalt or bitumen using polymers made with monocyclopentadienyl derivatives and a suitable cocatalyst but no particular polymer types are identified for this application.

U.S. Pat. No. 4263 186 relates to bitumen and polymer containing compositions for making sheets which employs high amounts of ethylene based elastomers and varying amounts of a partially crystalline polyolefin. There is no disclosure of the use of a limited amount of a particular ethylene based copolymer having a crystallinity of less than 18%.

EP 351736 discloses waterproof sheets containing major amounts ethylene based copolymers. Example 9 uses a polymer having a density of 0.88.

GB 1522852 discloses an adhesive composition containing bitumen, block copolymer and a small amount of a thermoplastic polymer having a crystallinity below 60% at 25° C. No reference is made to the specific low crystallinity desired for the construction materials of the invention.

GB 1247247 discloses use of "atactic" ethylene based polymers with less than 20 wt % of crystallinity polymer in amounts of from 3 to 20 wt %. However the paving compositions made thereby employ petrolene which is de-asphalted. The petrolene is not a bitumen as defined herein.

Polymers form one phase mixtures with petrolenes. The text does not suggest using these materials with straight reduced asphalt (from which the petrolene is extracted) and it is believed that the polymers specifically disclosed (atactic polypropylene) would act quite distinctly. The prior art aims to increase the softening point and not to provide a distinct phase which aids cohesion of bitumen at low temperatures.

Many polymers suitable for bitumen modification may be difficult to process with the flexibility desired in the construction industry.

It is amongst the objectives of the invention to provide compositions with improved low temperature properties in construction end-uses which can be processed (mixed or blended) starting from a pelletised form.

SUMMARY OF INVENTION

This invention provides compositions useful for paving and road surfaces. It also provides a novel use for thermoplastic polymer with bitumen. Preferably, the bitumen additive is derived predominantly from ethylene and another non-cyclic alpha-olefin.

DETAILED DESCRIPTION OF THE INVENTION

Figure 1:
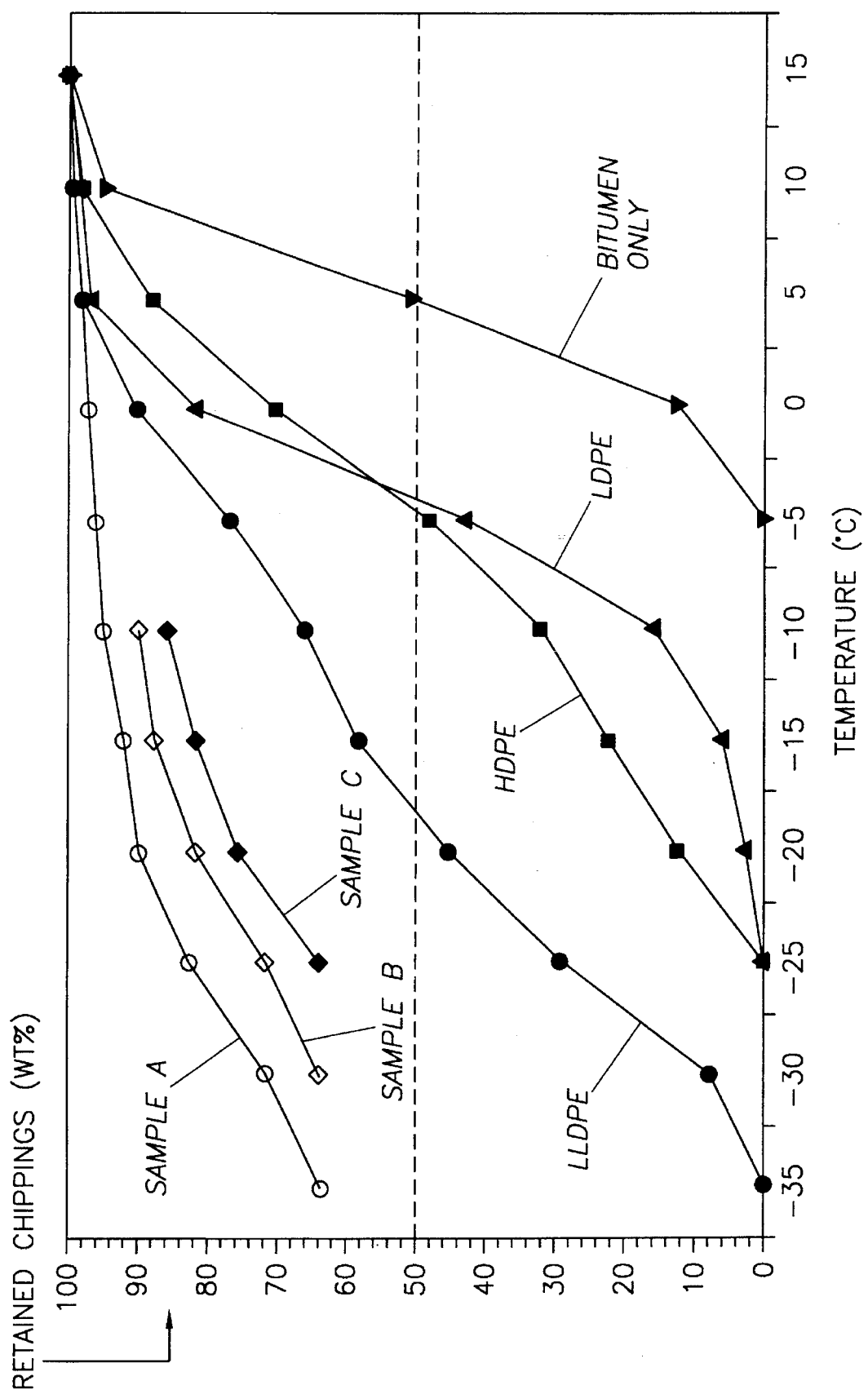
FIG. 1 provides a graphic presentation of the Vialit Cohesion tests run on bitumen modified with about 5% of various polymers.

The invention firstly provides a composition for use in road paving including a two-phase mixture of (a) a structural bitumen component; and (b) from 1 to 20 wt % by weight of (a)+(b) of a thermoplastic polymer derived predominantly of ethylene and at least one other non-cyclic alpha olefin, said polymer having a crystallinity of less than 18% preferably less than 10%.

Secondly, the invention provides a road surface comprising a composition including a two-phase mixture of (a) a structural bitumen (b) from 1 to 20 wt % by weight of (a)+(b) of a thermoplastic polymer derived predominantly of ethylene and at least one other non-cyclic alpha olefin, said polymer having a crystallinity of less than 18% preferably less than 10%.

Thirdly the invention provides the use of from 1 to 20 wt % by weight of a thermoplastic polymer derived predominantly of ethylene and at least one other non-cyclic alpha olefin, said polymer having a crystallinity of less than 18% preferably less than 10% in admixture with a the structural component of bitumen in making a road paving, the wt % being on the total weight of the polymer and bitumen.

It is especially desired that the crystallinity is less than 15% and it may advantageously be below 5%.

The thermoplastic polymer consists predominantly of ethylene, i.e. at least 50 wt % of ethylene. Most comonomers may be used, but it is preferred that at least 75 tool % of the comonomers used is an olefin having four or more carbon atoms such as butene-1, hexene-1, octene-1. The use of a sufficient proportion of these comonomers may assist in restricting cold flow and making polymer pelletisable, with pellets which remain discrete and detachable and which so do not agglomerate.

Preferably the polymer contains less than 40 wt % and above 20 wt % of the comonomer.

Preferably the polymer has no beta transition point. Suitably the polymer has a density of 0.86 to 0.88 g/cm³.

Minor amount of one or more other copolymerisable materials may be present such as polyenes or a cyclic alpha-olefin such as styrene but generally in an amount of less than 10 wt % preferably less than 5 wt %.

The polymer preferably has a narrow molecular weight distribution and preferably has ratio of weight average molecular weight to number average molecular weight (Mw/Mn) of 1.5 to 3 measured by Gel Permeation Chromatography (GPC). Suitable Mw/Mn may be selected to meet the required handling and dispersion needs.

The comonomer units are suitably evenly divided to provide a low cluster index.

The crystallinity is determined by Differential Scanning Calorimetry (DSC) using ASTM-D 3417 for determining the enthalpy of melting and crystallisation of polymers.

Depending on the end-use the Melt Index (MI) (as determined by ASTM D 1238 Condition E) is between 200 and 0.1, preferably less than 50 and sometimes below 15.

The distribution of comonomers throughout the polymer chain is characterised by a test which provides a "Solubility Distribution Breadth Index" (SDBI).

In general, this test measures the solubility of a polymer resin sample at varying temperatures in a specific solvent. The net effect is that the low molecular weight species within a polymer sample will be generally more soluble in solvent at the lower temperatures. As the temperature of the sample and solvent is increased, the higher molecular weight species begin to solvate. This allows for a detector, which is downstream from the elution column, to measure the amount of solvated polymer which elutes at various temperatures. Integrating the function, which includes the weight polymer eluted at each incrementally increased temperature and the differential of the temperature, yields an average temperature of solvation. The SDBI is then derived from that figure by taking the fourth root of the elution temperature minus the average elution temperature which is raised to the fourth power, and including the temperature differential term. The inclusion of the fourth power term makes this particular measurement very sensitive to the highly soluble polymer fractions at the low end of the molecular weight spectrum.

Solubility Distribution is measured using a column which is 164 cm long and has a 1.8 cm ID (inner diameter) is packed with non-porous glass beads (20– 30 mesh) and immersed in a temperature programmable oil bath. The bath is stirred vigorously to minimise temperature gradients within the bath, and the bath temperature is measured using a platinum resistance thermometer. About 1.6 g of polymer is placed in a sample preparation chamber and repeatedly evacuated and filled with nitrogen to remove oxygen from the system. A metered volume of tetrachloroethylene solvent is then pumped into the sample preparation chamber, where it is stirred and heated under 3 atmospheres pressure at 140° C. to obtain a polymer solution of about 1 percent concentration. A metered volume of this solution, 100 cc is then pumped into the packed column thermostated at about 120° C.

The polymer solution in the column is subsequently crystallised by cooling the column to 0° C. at a cooling rate of about 20° C./min. The column temperature is then maintained at 0° C. for 25 minutes. The elution stage is then begun by pumping pure solvent, preheated to the temperature of the oil bath, through the column at a flow rate of 27 ml/min. Effluent from the column passes through a heated line to an IR detector which is used to measure the absorbance of the effluent stream. The absorbance of the polymer carbon-hydrogen stretching bands at about 2960 cm$^{-1}$ serves as a continuous measure of the relative weight percent concentration of polymer in the effluent. After passing through the infrared detector the temperature of the effluent is reduced to atmospheric pressure before passing the effluent stream into an automatic fraction collector. Fractions are collected in 3° C. intervals. In the elution stage pure tetrachloroethylene solvent is pumped through the column at 0° C. at 27 ml/min for 25 min. This flushes polymer that has not crystallized during the cooling stage out of the column so that the percent of uncrystallized polymer (i.e., the percent of polymer soluble at 0° C.) can be determined from the infrared trace. The temperature is then programmed upward at a rate of 1.0° C./min. to 120° C. A solubility distribution curve, i.e., a plot of weight fraction of polymer solvated as a function of temperature, is thus obtained.

The procedure for calculating the Solubility Distribution Breadth Index (SDBI) is set forth below. Where, for illustration purposes only, Sample X has a narrow solubility distribution and elutes over a narrow solubility distribution and elutes over a narrow temperature range compared to Sample Y, which has a broad solubility distribution, the Solubility Distribution Breadth Index (SDBI) can be used as a measure of the breadth of the solubility distribution curve..

Let w (T) be the weight fraction of polymer eluting (dissolving) at temperature T. The average dissolution temperature, $T_{ave}$, is given by $T_{ave}$=Tw(T)dT, where w(T)dT =1

SDBI is calculated using the relation:

SDBI (°C.)=$\sqrt[4]{R-T_{ave})^4 w(T)dt}$ (SDBI is thus analogous to the standard deviation of the solubility distribution curve, but it involves the fourth power rather than the second power to T–$T_{ave}$).

The preferred values of SDBI are less than 28° C. and more preferred less than 25° C. and even more preferred less than 20° C.

The presence of components other than (a)+(b) is of course permitted. However the compositions should preferably contain less than 4% by wt of (c) a block copolymer such as SBS based on the total weight.

The invention fourthly provides a clear binder composition for use in paving surfaces including a mixture of (a) a hydrocarbon tackifier resin, preferably in an amount of from 99 to 80 wt % and from 1 to 20 weight percent by weight of a thermoplastic polymer derived predominantly of ethylene and at least one other non-cyclic alpha olefin, said polymer having a crystallinity of less than 18% preferably less than 10%, the wt %, being determined on the basis of (a)+(b). Features may be varied as discussed herein.

Fifthly and most generally the invention provides a composition for use as a construction material including (a) a bitumen or a hydrocarbon tackifier resin, preferably in an amount of from 80 to 99 wt % and (b) from 1 to 20 wt % of a thermoplastic polymer derived predominantly of ethylene and at least one other alpha olefin, said polymer having a Tg of less than –30° C., preferably less than –50° C. to improve low temperature flexibility, the wt % being based on the weight of (a)+(b).

The compositions of the invention are particularly useful in the road construction industry. The composition may be prepared by a process in which hot stones are coated with the molten polymer and then blended with hot bitumen. Also the polymer and the bitumen may be mixed whereupon warm stones may be added to the blend.

EXAMPLES

Mixtures of 5% polymer and 95% 180/200 bitumen were prepared as set out in Table 1.

TABLE 1

| Polymer | Percentage Comonomer | Density | Percentage Crystallinity | MI | Mw/Mn | Temperature for 50% chipping retained by Vialit cohesion °C. | Penetration PEN. | Softening point Ring + Ball |
|---|---|---|---|---|---|---|---|---|
| Ethylene-butene *Sample A | 34 | 0.859 | 0 | 1.0 | 2.35 | <−30 | 81 | 49 |
| Ethylene-butene *Sample B | | 0.8805 | 15.2 | 2.2 | | −30 | 81 | 54.5 |
| Ethylene-butene *Sample C | | 0.8815 | 16 | 9.3 | | −30 | 83 | 53 |
| LLDPE (butene) | 8 | 0.918 | 45 | 1.0 | 3.55 | −18 | — | 107(*) |
| LDPE | 0 | 0.919 | 43 | 0.8 | 5.7 | −4 | 94 | 47 |
| HDPE | 0 | 0.965 | 75 | 1.8 | 5.9 | −5 | 48 | 112(*) |
| Ethylene methyl acrylate | 24 | 0.949 | 16 | 1.1 | 4.1 | −5 | 104 | 62 |

*ball falls through disk
The bitumen details are set out in Table 2.

TABLE 2

| Penetration 25° C., 100 g, 5s | dmm | 187 |
|---|---|---|
| Penetration Index LCPC | | −1.9 |
| Softening Point R&B | °C. | 39 |
| Specific Gravity 25° C. | | 1.020 |
| Viscosity 135° C. | mm2/s | 214 |

The components were blended at 180° C. for 90 min (after polymer addition) at a stirring speed of 1000–1500 rpm in a Moritz Turbine L60.

The blend (immediately after mixing and as quickly as possible) is spread onto three preheated metal plates (1 mm film thickness) for the Vialit cohesion test (see below). Penetration and softening point are also be tested.

To perform the Vialit test the plate to be covered with the blend is preheated at 50° C., the binder blend spread onto the plate and chippings are rolled on. The plate with binder and chippings is further stored at 50° C. for 6 hours, to ensure good wetting of the chippings by the binder; and then put in the oven at the first test temperature (15° C.) overnight. A shock test is carried out, decreasing temperature in steps of 5° C. with a minimum 2.5 hours storage at each temperature. The percentage of chippings retained on the surface of the binder is determined until 50 percent is just retained.

More details of the Vialit test results are set out in FIG. 1.

We claim:

1. A composition comprising a two-phase mixture of
   (a) a structural bitumen component; and
   (b) from 1 to 20 wt % of a thermoplastic polymer derived predominantly of ethylene and at least one other non-cyclic alpha olefin having at least four carbon atoms, said polymer having a crystallinity of less than 18%, and a Solubility Distribution Breadth Index value of less than 28° C., in which the wt % is based on the total weight of the polymer and the bitumen component.

2. A road surface comprising a composition comprising a two-phase mixture of
   (a) a structural bitumen component; and
   (b) from 1 to 20 wt % of a thermoplastic polymer derived predominantly of ethylene and at least one other non-cyclic alpha olefin having at least four carbon atoms, said polymer having a crystallinity of less than 18%, and a Solubility Distribution Breadth Index value of less than 28° C., in which the wt % is based on the total weight of the polymer and the bitumen component.

3. A method of producing a composition for use in road paving, comprising the step of;mixing from 1 to 20 wt % of a thermoplastic polymer derived predominantly of ethylene and at least one other non-cyclic alpha olefin having at least four carbon atoms., said polymer having a crystallinity of less than 18% and Solubility Distribution Breadth Index value of less than 28° C. with a structural component of bitumen, in which the wt % is based on the total weight of polymer and bitumen component.

4. Composition according to claim 1 in which the thermoplastic polymer (b) has a Melt index of less than 200; is pelletisable and has substantially no cold flow; and/or has a $T_g$ of less than −30° C.

5. Surface according to claim 2 in which the thermoplastic polymer (b) has a Melt index of less than 200; is pelletisable and has substantially no cold flow; and/or has a $T_g$ of less than −30° C.

6. Method according to claim 3 in which the thermoplastic polymer (b) has a Melt index of less than 200; is pelletisable and has substantially no cold flow; and/or has a $T_g$ of less than −30° C.

7. Composition according to claim 4 in which the composition also contains chipping's and/or stones and the temperature for 50% adhesion for chipping retention by the Vialit Cohesion test is less than minus 25° C.

8. Surface according claim 5 in which the composition also contains chipping's and/or stones and the temperature for 50% adhesion for chipping retention by the Vialit Cohesion test is less than minus 25° C.

9. Method according to claim 6 in which the composition also contains chipping's and/or stones and the temperature for 50% adhesion for chipping retention by the Vialit Cohesion test is less than minus 25° C.

10. Composition according to claim 7 in which the polymer (b) has no beta transition temperature.

11. Surface according claim 8 in which the polymer (b) has no beta transition temperature.

12. Method according to claim 9 in which the polymer (b) has no beta transition temperature.

13. Composition according to claim 1 in which said polymer has a crystallinity of less than 10%.

14. Surface according to claim 2 in which said polymer has a crystallinity of less than 10%.

15. Method according to claim 3 in which said polymer has a crystallinity of less than 10%.

16. Composition according to claim 4 in which the thermoplastic polymer (b) has a $T_g$ of less than −50° C.

17. Surface according to claim 5 in which the thermoplastic polymer (b) has a $T_g$ of less than −50° C.

18. Method according to claim 6 in which the thermoplastic polymer (b) has a $T_g$ of less than −50° C.

19. Composition according to claim 1 in which said polymer has a Solubility Distribution Breadth Index value of less than 25° C.

20. Composition according to claim 1 in which said polymer has a Solubility Distribution Breadth Index value of less than 20° C.

21. Surface according to claim 2 in which said polymer has a Solubility Distribution Breadth Index value of less than 25° C.

22. Surface according to claim 2 in which said polymer has a Solubility Distribution Breadth Index value of less than 20° C.

23. Method according to claim 3 in which said polymer has a Solubility Distribution Breadth Index value of less than 25° C.

* * * * *